United States Patent
Lindemann

(10) Patent No.: US 9,803,735 B2
(45) Date of Patent: Oct. 31, 2017

(54) NORMALLY ENGAGED TURBINE CLUTCH

(71) Applicant: Schaeffler Technologies AG & Co. KG, Herzogenaurach (DE)

(72) Inventor: Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 14/943,327

(22) Filed: Nov. 17, 2015

(65) Prior Publication Data

US 2016/0153534 A1    Jun. 2, 2016

Related U.S. Application Data

(60) Provisional application No. 62/086,465, filed on Dec. 2, 2014.

(51) Int. Cl.
*F16H 45/02* (2006.01)

(52) U.S. Cl.
CPC ..... *F16H 45/02* (2013.01); *F16H 2045/0205* (2013.01); *F16H 2045/0221* (2013.01); *F16H 2045/0247* (2013.01); *F16H 2045/0278* (2013.01); *F16H 2045/0294* (2013.01)

(58) Field of Classification Search
CPC .............................................. F16H 2045/0205
See application file for complete search history.

(56) References Cited

U.S. PATENT DOCUMENTS

| 3,228,503 A * | 1/1966 | Maurice ............. F16D 25/12 192/3.33 |
| 4,113,075 A | 9/1978 | Walker |
| 8,042,665 B2 * | 10/2011 | Sturgin ............. F16H 45/02 192/3.26 |
| 8,607,948 B2 | 12/2013 | Sturgin et al. |
| 2008/0078638 A1 | 4/2008 | Degler et al. |

(Continued)

FOREIGN PATENT DOCUMENTS

JP    09100894 A    4/1997

OTHER PUBLICATIONS

International Search Report and Opinion for PCT/US2015/061021; 10 pgs; dated Jan. 26, 2016 by Korean Intellectual Property Office.

*Primary Examiner* — Robert A Siconolfi
*Assistant Examiner* — Ryan Dodd
(74) *Attorney, Agent, or Firm* — LeKeisha M. Suggs; Kevin L. Parks

(57) ABSTRACT

A torque converter includes a housing, a turbine shell, and a spring. The housing includes an impeller shell and a cover. The turbine shell includes a clutch portion. The spring is disposed axially between the cover and the turbine shell, and is arranged for urging the turbine clutch portion into driving engagement with the impeller shell. In an example embodiment, the spring is a diaphragm spring. In an example embodiment, the turbine shell is arranged for sealing to and driving engagement with a transmission input shaft. In some example embodiments, the torque converter includes a bearing disposed axially between the cover and the turbine shell, and arranged for rotationally disconnecting the spring from the cover. In an example embodiment, the bearing is a ball bearing or a needle roller bearing.

15 Claims, 2 Drawing Sheets

(56) References Cited

U.S. PATENT DOCUMENTS

| | | |
|---|---|---|
| 2009/0014269 A1 | 1/2009 | Ari et al. |
| 2013/0140122 A1 | 6/2013 | Hemphill et al. |
| 2013/0230385 A1* | 9/2013 | Lindemann ............ F16D 33/18 415/122.1 |
| 2013/0291528 A1* | 11/2013 | Strong ................... F16H 45/02 60/341 |
| 2015/0008086 A1* | 1/2015 | Mototsune ............. F16H 45/02 192/3.29 |
| 2015/0053521 A1 | 2/2015 | Frary |
| 2016/0116042 A1* | 4/2016 | Depraete ............... F16H 45/02 192/3.29 |

* cited by examiner

NORMALLY ENGAGED TURBINE CLUTCH

FIELD

The invention relates generally to a turbine clutch, and more specifically to a normally engaged turbine clutch.

BACKGROUND

It is known to use a spring to engage an impeller clutch as shown and described in commonly assigned U.S. patent application Ser. No. 14/458,851, for example, hereby incorporated by reference as if set forth fully herein. It is also known to use a single pressure chamber to apply an impeller clutch and a torque converter clutch, keeping the torque converter clutch disengaged by a spring during torque converter operation, as shown and described in commonly assigned U.S. Pat. No. 8,607,948 and United States Patent Application Publication No. 2013/0140122, for example, both hereby incorporated by reference as if set forth fully herein.

BRIEF SUMMARY

Example aspects broadly comprise a torque converter including a housing, a turbine shell, and a spring. The housing includes an impeller shell and a cover. The turbine shell includes a clutch portion. The spring is disposed axially between the cover and the turbine shell, and is arranged for urging the turbine clutch portion into driving engagement with the impeller shell. In an example embodiment, the spring is a diaphragm spring. In an example embodiment, the turbine shell is arranged for sealing to and driving engagement with a transmission input shaft. In some example embodiments, the torque converter includes a bearing disposed axially between the cover and the turbine shell, and arranged for rotationally disconnecting the spring from the cover. In an example embodiment, the bearing is a ball bearing or a needle roller bearing.

In some example embodiments, the torque converter has a drive ring fixed to the turbine shell. In an example embodiment, the drive ring is drivingly engaged with the spring or an output hub. In an example embodiment, the spring is arranged for urging the drive ring towards the impeller shell. In some example embodiments, the torque converter has a damper drivingly engaged with the turbine shell and arranged for driving connection to a transmission input shaft. The damper includes a damper plate and the drive ring includes an axial protrusion extending through the damper plate. In an example embodiment, the damper plate includes a slot and the drive ring axial protrusion is at least partially rotationally displaceable within the damper plate slot.

In an example embodiment, the torque converter has respective pluralities of blades fixed to the impeller shell and the turbine shell. In an example embodiment, the torque converter has a thrust plate fixed to the impeller shell, a first clutch plate drivingly engaged with the turbine shell, and a second clutch plate drivingly engaged with the thrust plate.

Other example aspects broadly comprise a torque converter including an impeller fixed to a cover housing, a turbine arranged for driving engagement with a transmission input shaft, and a first resilient element compressed between the cover housing and the turbine shell. In an example embodiment, the turbine shell is arranged for sealing to a transmission input shaft. In an example embodiment, the torque converter has a bearing or bushing for rotationally disconnecting the resilient element from the cover housing or the turbine shell. In some example embodiments, the torque converter has a damper. The damper includes a drive tab fixed to the turbine shell, a spring retainer arranged for driving engagement with a transmission input shaft, and a second resilient element for transmitting torque between the drive tab and the spring retainer. In an example embodiment, the first resilient element is disposed axially between the cover housing and the spring retainer and the second resilient element is disposed radially outside of the first resilient element.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
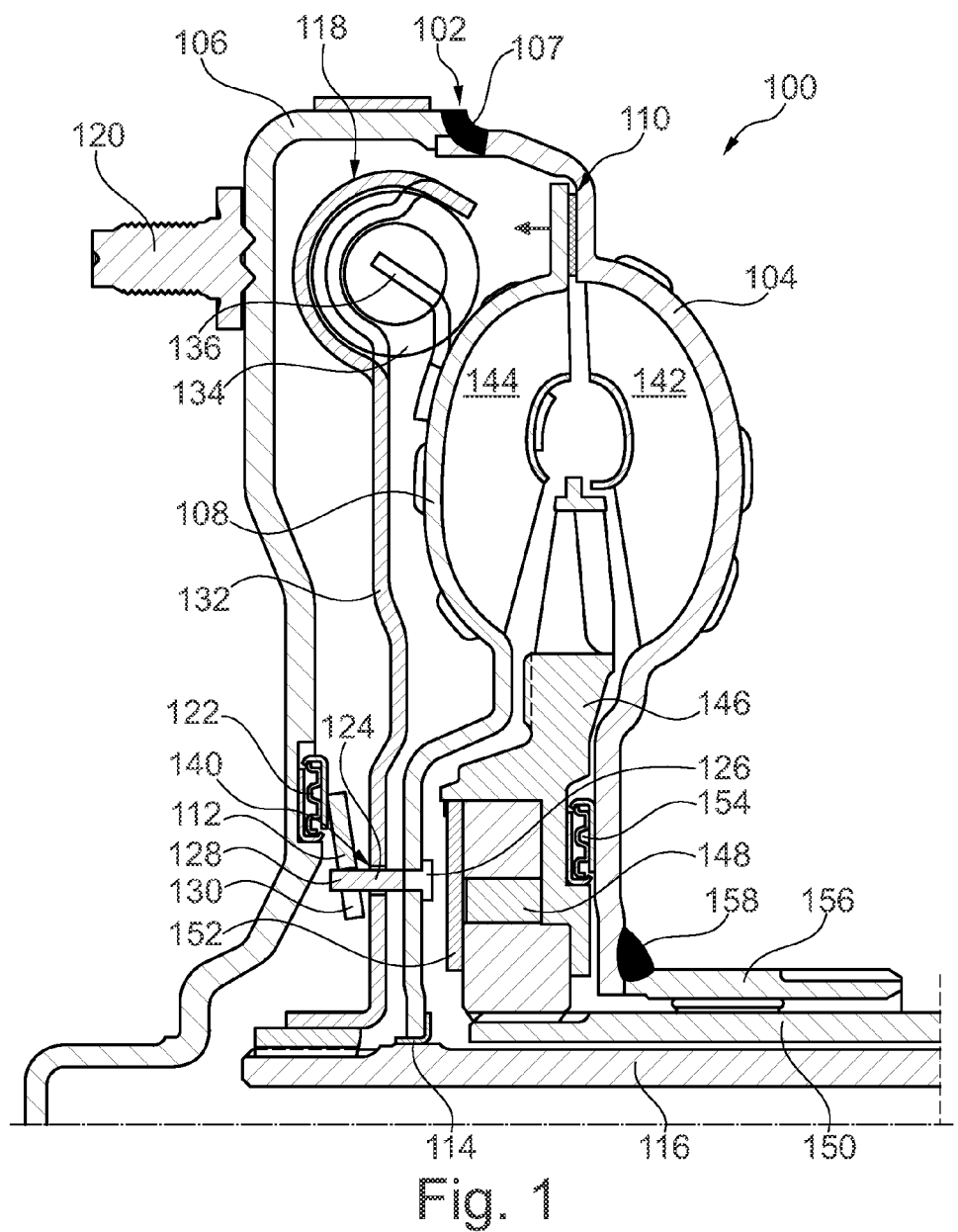
FIG. 1 is a cross-section view of a torque converter with a normally engaged turbine clutch according to an example aspect.

The following description is made with reference to FIG. 1. FIG. 1 is a cross section view of torque converter 100 including a normally engaged turbine clutch according to an example aspect. Torque converter 100 includes housing 102 with impeller shell 104 fixed to cover 106 at weld 107, for example, turbine shell 108 with clutch portion 110, and spring, or resilient element, 112. In an example embodiment, spring 112 is a diaphragm spring. Spring 112 is disposed axially between cover 106 and turbine shell 108.

The spring is arranged for urging the turbine clutch portion into driving engagement with the impeller shell. That is, when installed in the torque converter, the spring is compressed between the cover housing and the turbine shell, and exerts a spring force which acts against the turbine shell to close the turbine clutch. The turbine clutch may be released using hydraulic pressure acting on the turbine shell to overcome the spring force, axially displacing the turbine shell and opening the turbine clutch so that the torque converter operates in a fluid circuit mode as is known in the art.

Turbine shell 108 is arranged for sealing to and driving engagement with transmission input shaft 116. That is, turbine shell 108 includes bushing or seal 114 that seals to input shaft 116 after installation with a transmission (not shown). Turbine shell 108 is drivingly engaged with the input shaft through damper 118 as will be described in further detail below.

Torque converter 100 may be drivingly connected to a prime mover, such as a vehicle engine, at studs 120, and the transmission at input shaft 116, for example, and installed in a vehicle (not shown). Torque converter 100 includes bearing, or bushing, 122 disposed axially between the cover and the turbine shell. Bearing 122 is arranged for rotationally disconnecting the spring from the cover. That is, the bearing permits relative rotational motion between the spring and the cover without friction or drag. In other words, when the cover is rotating and the turbine is not, when the vehicle is stopped at a traffic light, for example, bearing 122 permits the cover to spin and the spring to remain stationary without drag or wear in either component. Bearing 122 may be a ball bearing or a needle roller bearing, as shown in FIG. 1, for example.

Torque converter 100 includes drive ring 124 fixed to turbine shell 108 at integral expanded portion 126, for example. Ring 124 is drivingly engaged with spring 112 at respective protrusions, or tabs, 128 and 130. Spring 112 is arranged for urging the drive ring towards the impeller shell. That is, spring tab 130 is presses against ring 124 which, in turn, pulls the turbine shell towards the impeller via fixed connection 126.

Damper 118 includes damper plate, or spring retainer, 132, spring, or resilient element, 134, and drive tab 136 fixed to the turbine shell. Damper 118 is drivingly engaged with the turbine shell at tab 136 and arranged for driving connection to a transmission input shaft through plate 132 fixed to splined hub 138. Resilient element 134 is for transmitting torque between the drive tab and the spring retainer. Resilient element 134 is disposed radially outside of resilient element 112. Drive ring axial protrusion 128 extends through the damper plate. That is, damper plate 132 includes slot 140 and the drive ring protrusion is at least partially rotationally displaceable within the damper plate slot.

Torque converter 100 includes respective pluralities of blades 142 and 144 fixed to the impeller shell and the turbine shell. Torque converter 100 further includes stator 146 with one way clutch 148, arranged for installation on transmission stator shaft 150, and side plate 152. Converter 100 further includes bearing 154 and hub 156 is fixed to the impeller shell by weld 158.

Figure 2:
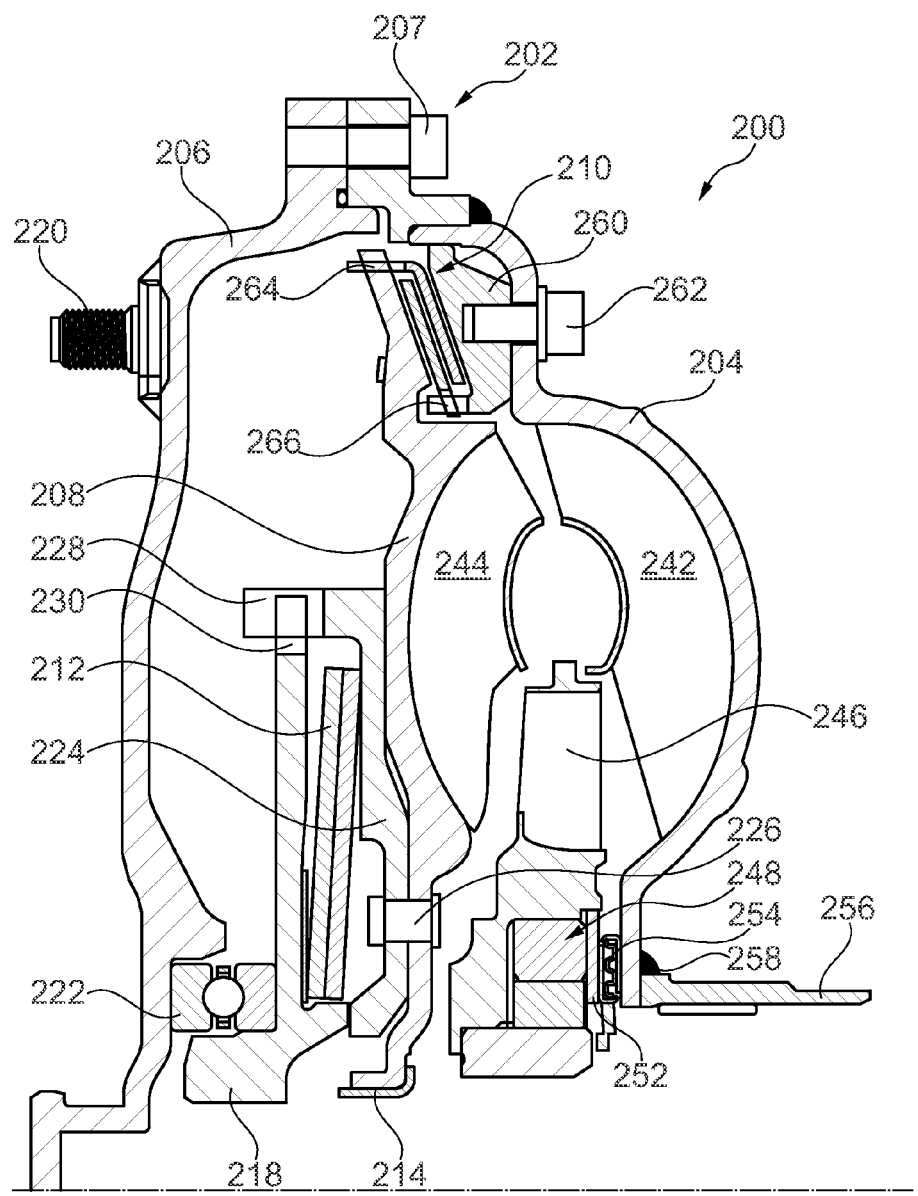
FIG. 2 is a cross-section view of a torque converter with a normally engaged turbine clutch according to an example aspect.

The following description is made with reference to FIG. 2. FIG. 2 is a cross section view of torque converter 200 including a normally engaged turbine clutch according to an example aspect. Torque converter 200 includes housing 202 with impeller shell 204 fixed to cover 206 at fastener 207, for example, turbine shell 208 with clutch portion 210, and spring, or resilient element, 212. In an example embodiment, spring 212 is a plurality of diaphragm springs. Spring 212 is disposed axially between cover 206 and turbine shell 208.

The spring is arranged for urging the turbine clutch portion into driving engagement with the impeller shell. That is, when installed in the torque converter, the spring is compressed between the cover housing and the turbine shell, and exerts a spring force which acts against the turbine shell to close the turbine clutch. The turbine clutch may be released using hydraulic pressure acting on the turbine shell to overcome the spring force, axially displacing the turbine shell and opening the turbine clutch so that the torque converter operates in a fluid circuit mode as is known in the art.

Turbine shell 208 is arranged for sealing to and driving engagement with a transmission input shaft (not shown). That is, turbine shell 208 includes bushing or seal 214 that seals to the input shaft after installation with a transmission (not shown). Turbine shell 208 is drivingly engaged with the input shaft through output hub 218 as will be described in further detail below.

Torque converter 200 may be drivingly connected to a prime mover, such as a vehicle engine, at studs 220, and the transmission at the input shaft, for example, and installed in a vehicle (not shown). Torque converter 200 includes bearing, or bushing, 222 disposed axially between the cover and the turbine shell. Bearing 222 is arranged for rotationally disconnecting the spring from the cover. That is, the bearing permits relative rotational motion between the spring and the cover without friction or drag. In other words, when the cover is rotating and the turbine is not, when the vehicle is stopped at a traffic light, for example, bearing 222 permits the cover to spin and the spring to remain stationary without drag or wear in either component. Bearing 222 may be a ball bearing as shown in FIG. 2, or a needle roller bearing, for example.

Torque converter 200 includes drive ring 224 fixed to turbine shell 208 at rivet 226, for example. Ring 224 is drivingly engaged with output hub 218 at respective protrusions, or tabs, 228 and 230. Spring 212 is arranged for urging the drive ring towards the impeller shell. That is, spring 212 presses against ring 224 which, in turn, pushes the turbine shell towards the impeller.

Torque converter 200 includes respective pluralities of blades 242 and 244 fixed to the impeller shell and the turbine shell. Torque converter 200 further includes stator 246 with one way clutch 248, arranged for installation on a transmission stator shaft (not shown), and side plate 252. Converter 200 further includes bearing 254 and hub 256 is fixed to the impeller shell by weld 258. Torque converter 200 includes thrust plate 260 fixed to the impeller shell via fastener 262, clutch plate 264 drivingly engaged with the turbine shell, and clutch plate 266 drivingly engaged with the thrust plate. The clutch plates are attached via respective tabs installed in complementary slots in the turbine shell and thrust plates.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A torque converter comprising:
    a housing comprising an impeller shell and a cover;
    a turbine shell including a clutch portion;
    a spring:
        disposed axially between the cover and the turbine shell; and,
        arranged for urging the clutch portion into driving engagement with the impeller shell;
    a drive ring fixed to the turbine shell; and,
    a damper drivingly engaged with the turbine shell and arranged for driving connection to a transmission input shaft, wherein:
        the damper comprises a damper plate; and,
        the drive ring includes an axial protrusion extending through the damper plate.

2. The torque converter of claim 1, wherein the spring is a diaphragm spring.

3. The torque converter of claim 1, wherein the turbine shell is arranged for sealing to and driving engagement with the transmission input shaft.

4. The torque converter of claim 1 further comprising a bearing:
   disposed axially between the cover and the turbine shell; and,
   arranged for rotationally disconnecting the spring from the cover.

5. The torque converter of claim 4 wherein the bearing is a ball bearing or a needle roller bearing.

6. The torque converter of claim 1 wherein the drive ring is drivingly engaged with the spring or an output hub.

7. The torque converter of claim 1 wherein the spring is arranged for urging the drive ring towards the impeller shell.

8. The torque converter of claim 1 wherein the damper plate includes a slot and the drive ring axial protrusion is at least partially rotationally displaceable within the damper plate slot.

9. The torque converter of claim 1 further comprising respective pluralities of blades fixed to the impeller shell and the turbine shell.

10. The torque converter of claim 1 further comprising:
   a thrust plate fixed to the impeller shell;
   a first clutch plate drivingly engaged with the turbine shell; and,
   a second clutch plate drivingly engaged with the thrust plate.

11. A torque converter comprising:
   an impeller fixed to a cover housing;
   a turbine shell arranged for driving engagement with a transmission input shaft and including a clutch portion;
   a first resilient element compressed between the cover housing and the turbine shell and arranged for urging the clutch portion into driving engagement with the impeller;
   a damper drivingly engaged with the turbine shell and including a damper plate; and,
   a drive ring fixed to the turbine shell and having an axial protrusion extending through the damper plate.

12. The torque converter of claim 11 wherein the turbine shell is arranged for sealing to the transmission input shaft.

13. The torque converter of claim 11 further comprising a bearing or bushing for rotationally disconnecting the resilient element from the cover housing or the turbine shell.

14. The torque converter of claim 11 wherein the damper further includes:
   a drive tab fixed to the turbine shell;
   a spring retainer arranged for driving engagement with the transmission input shaft; and,
   a second resilient element for transmitting torque between the drive tab and the spring retainer.

15. The torque converter of claim 14 wherein the first resilient element is disposed axially between the cover housing and the turbine shell and the second resilient element is disposed radially outside of the first resilient element.

* * * * *